United States Patent
Degura

(10) Patent No.: US 10,452,833 B2
(45) Date of Patent: Oct. 22, 2019

(54) ELECTRONIC DEVICE AND METHOD OF CONTROLLING ELECTRONIC DEVICE

(71) Applicant: CANON KABUSHIKI KAISHA, Tokyo (JP)

(72) Inventor: Yasusaburo Degura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/278,366

(22) Filed: Sep. 28, 2016

(65) Prior Publication Data

US 2017/0103197 A1 Apr. 13, 2017

(30) Foreign Application Priority Data

Oct. 9, 2015 (JP) .................................. 2015-201584

(51) Int. Cl.
  *G06F 1/26* (2006.01)
  *G06F 21/44* (2013.01)
  (Continued)

(52) U.S. Cl.
  CPC ................ *G06F 21/44* (2013.01); *G06F 1/26* (2013.01); *G06F 21/81* (2013.01); *H04N 5/23241* (2013.01)

(58) Field of Classification Search
  CPC ............. H02J 2007/0001; H02J 7/0004; H02J 7/0047; H02J 7/0029; H02J 7/0031;
  (Continued)

(56) References Cited

U.S. PATENT DOCUMENTS

| 5,105,294 A | 4/1992 | Degura et al. |
| 5,113,278 A | 5/1992 | Degura et al. |

(Continued)

FOREIGN PATENT DOCUMENTS

| JP | 2004-185194 | 7/2004 |
| JP | 2007-282471 A | 10/2007 |

(Continued)

OTHER PUBLICATIONS

Japanese Office Action dated Apr. 8, 2019 during prosecution of related Japanese application No. 2015-201584. (English-language machine translation included.).

*Primary Examiner* — Jaweed A Abbaszadeh
*Assistant Examiner* — Brian J Corcoran
(74) *Attorney, Agent, or Firm* — Venable LLP

(57) ABSTRACT

An electronic device includes an authentication unit that performs authentication to determine whether a power supply apparatus connected to the electronic device is a predetermined apparatus, a selection unit that makes a user select whether to use the power supply apparatus, when the authentication has failed, a storage unit that stores information indicating that the authentication has succeeded or the user has selected to use the power supply apparatus as history information. When the power supply apparatus is detached from the electronic device, the history information is deleted from the storage unit. The electronic device permits use of the power supply apparatus connected to the electronic device when the history information is stored in the storage unit while the electronic device is in a power ON state.

42 Claims, 7 Drawing Sheets

(51) Int. Cl.
*G06F 21/81* (2013.01)
*H04N 5/232* (2006.01)

(58) Field of Classification Search
CPC .......... H02J 7/0055; G06F 1/26; G06F 21/44; G06F 2221/2129; G06F 21/445; G01R 31/3665; H01M 10/4221
See application file for complete search history.

(56) References Cited

U.S. PATENT DOCUMENTS

| | | | |
|---|---|---|---|
| 5,264,955 A | 11/1993 | Sakanaka et al. | |
| 6,563,318 B2 | 5/2003 | Kawakami et al. | |
| 6,683,440 B2 | 1/2004 | Kawakami et al. | |
| 7,683,571 B2 | 3/2010 | Takamatsu et al. | |
| 9,438,797 B2 | 9/2016 | Matsushima | |
| 2005/0050325 A1* | 3/2005 | Ohkubo | G06F 21/31 713/168 |
| 2007/0123304 A1* | 5/2007 | Pattenden | G06F 1/26 455/557 |
| 2007/0214296 A1* | 9/2007 | Takamatsu | H02J 7/0004 710/63 |
| 2008/0007647 A1* | 1/2008 | Masuda | H02J 7/0055 348/372 |
| 2009/0088992 A1* | 4/2009 | Matsumura | H01M 10/425 702/63 |
| 2009/0256717 A1* | 10/2009 | Iwai | G06F 1/26 340/5.8 |
| 2010/0078016 A1* | 4/2010 | Andrieux | H01M 10/42 128/202.22 |
| 2010/0213890 A1* | 8/2010 | Winger | H02J 7/0047 320/106 |
| 2012/0049785 A1* | 3/2012 | Tanaka | B60L 3/0046 320/106 |
| 2014/0196142 A1* | 7/2014 | Louboutin | G06F 21/44 726/16 |
| 2015/0189177 A1 | 7/2015 | Matsushima | |

FOREIGN PATENT DOCUMENTS

| | | |
|---|---|---|
| JP | 2007-318943 | 12/2007 |
| JP | 2015-127889 | 7/2015 |

* cited by examiner

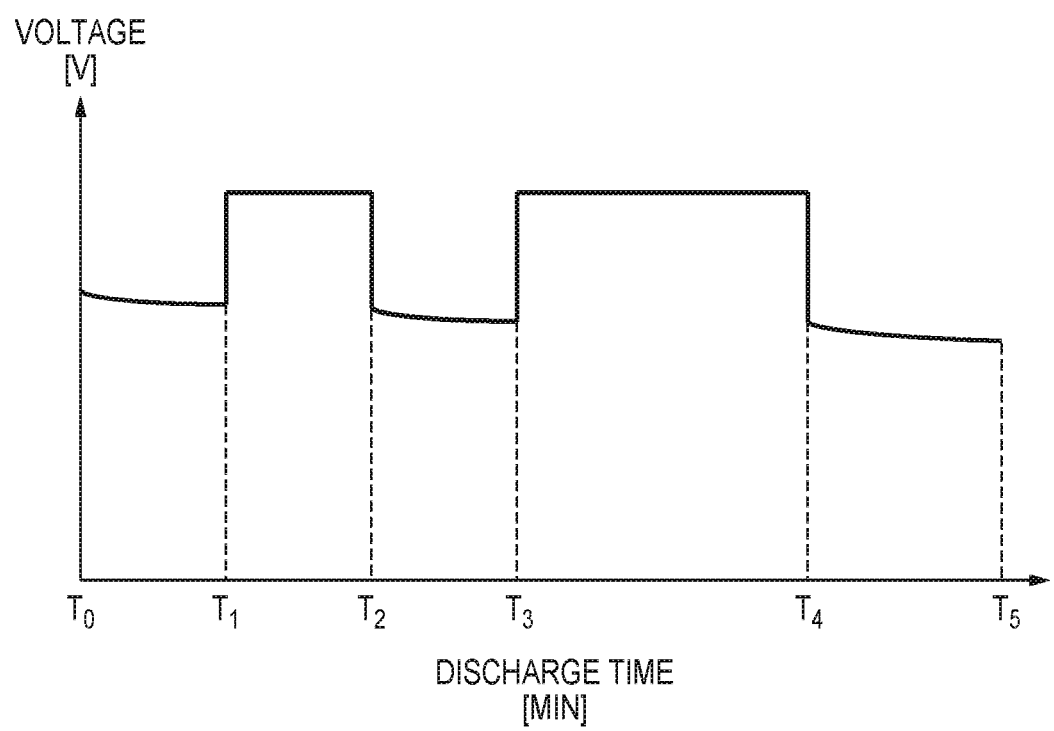

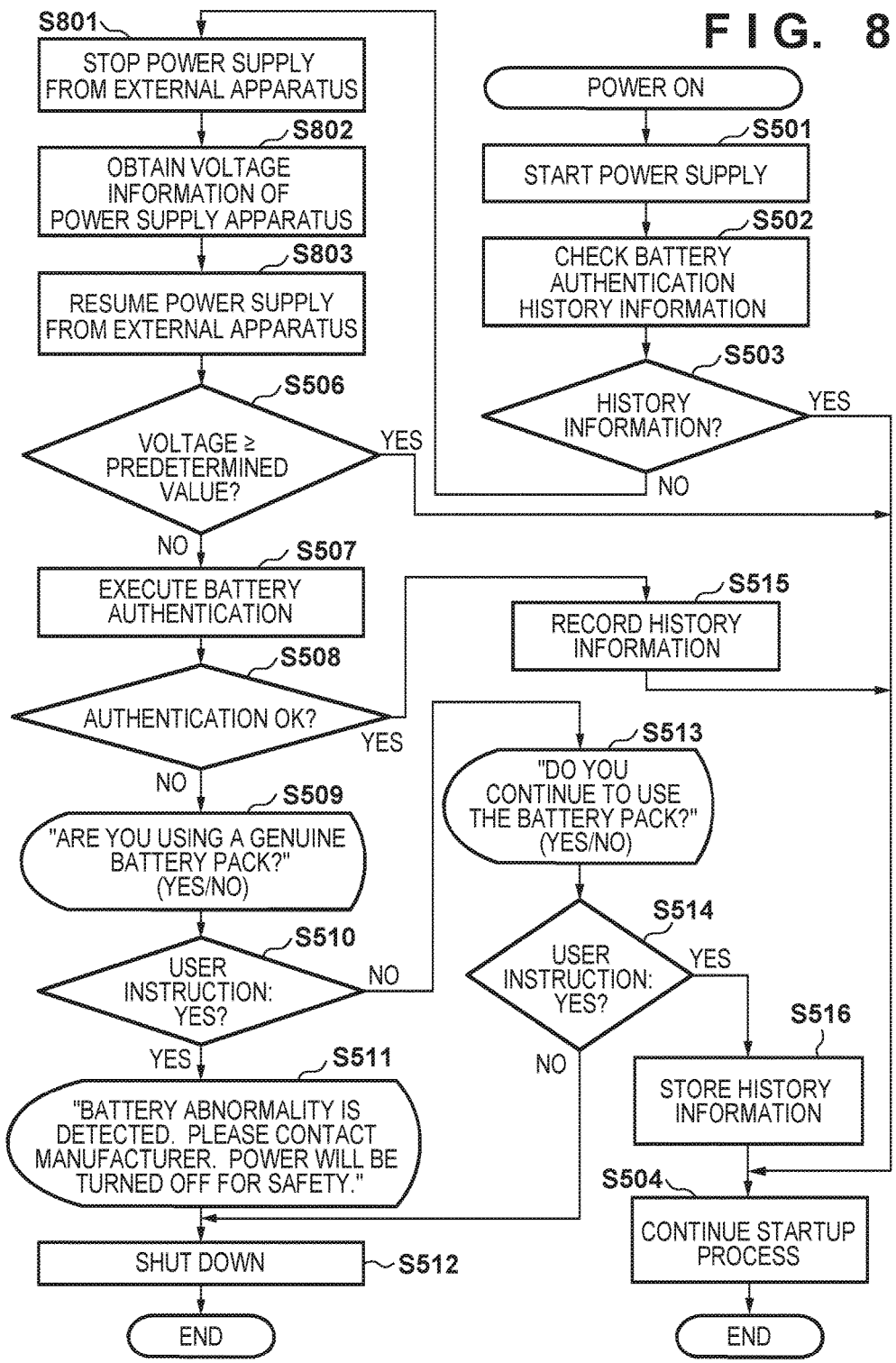

ELECTRONIC DEVICE AND METHOD OF CONTROLLING ELECTRONIC DEVICE

BACKGROUND

Field of the Invention

Aspects of the present invention generally relate to an electronic device and a method of controlling the electronic device.

Description of the Related Art

As a power supply apparatus which supplies power to an electronic device, a battery pack having a chargeable battery is available. An electronic device which can operate on a battery pack has a problem that the use of an unauthentic battery pack degrades safety. An unauthentic battery pack is an illegal battery pack disguised as a battery pack manufactured by an electronic device manufacturer or third party. A genuine battery pack has a protection mechanism (a fuse or the like) or control circuit which satisfies a predetermined quality standard and hence has high safety. In contrast to this, many unauthentic battery packs do not have such a protection mechanism or control circuit. For this reason, the use of an unauthentic battery pack may cause an electronic device to malfunction and may also degrade the safety of the electronic device.

Japanese Patent Laid-Open No. 2007-282471 discloses an electronic device which can determine whether a battery pack is a genuine battery pack.

The electronic device disclosed in Japanese Patent Laid-Open No. 2007-282471 is configured to authenticate a battery pack every time the power of the electronic device is turned on. For this reason, if a battery pack connected to the electronic device is the one manufactured by a third party, every time the power of the electronic device is turned on, it is necessary to inquire of the user whether the battery pack connected to the electronic device is a genuine battery pack. The user needs to respond to the inquiry. This will reduce user-friendliness.

In addition, the electronic device disclosed in Japanese Patent Laid-Open No. 2007-282471 is assumed to use only a battery pack as a power supply apparatus. For this reason, when an AC adapter having almost the same shape as that of a battery pack is connected to the electronic device, even if the AC adapter is a genuine AC adapter, the device determines that the AC adapter is an unauthentic battery pack. For this reason, even if an AC adapter is a genuine AC adapter, the user cannot use the AC adapter without inquiry whether or not the adapter is genuine. This will reduce user-friendliness.

SUMMARY

According to an aspect of the present invention, it is possible to facilitate the use of an electronic device which can operate on power supplied from a power supply apparatus.

According to an aspect of the present invention, it is possible to facilitate the use of an electronic device which can change a battery pack.

According to an aspect of the present invention, an electronic device includes: an authentication unit that performs authentication to determine whether a power supply apparatus connected to the electronic device is a predetermined apparatus; a selection unit that makes a user select whether to use the power supply apparatus, when the authentication has failed; a storage unit that stores information indicating that the authentication has succeeded or the user has selected to use the power supply apparatus as history information, wherein when the power supply apparatus is detached from the electronic device, the history information is deleted from the storage unit; and a permission unit that permits use of the power supply apparatus connected to the electronic device when the history information is stored in the storage unit while the electronic device is in a power ON state.

According to an aspect of the present invention, a method includes: performing authentication to determine whether a power supply apparatus connected to an electronic device is a predetermined apparatus; making a user select whether to use the power supply apparatus, when the authentication has failed; storing information indicating that the authentication has succeeded or the user has selected to use the power supply apparatus as history information in a storage unit, wherein when the power supply apparatus is detached from the electronic device, the history information is deleted from the storage unit; and permitting use of the power supply apparatus connected to the electronic device when the history information is stored in the storage unit while the electronic device is in a power ON state.

According to an aspect of the present invention, a non-transitory storage medium stores a program causing a computer to execute a method, the method including: performing authentication to determine whether a power supply apparatus connected to an electronic device is a predetermined apparatus; making a user select whether to use the power supply apparatus, when the authentication has failed; storing information indicating that the authentication has succeeded or the user has selected to use the power supply apparatus as history information in a storage unit, wherein when the power supply apparatus is detached from the electronic device, the history information is deleted from the storage unit; and permitting use of the power supply apparatus connected to the electronic device when the history information is stored in the storage unit while the electronic device is in a power ON state.

Further features and aspects of the present invention will become apparent from the following description of exemplary embodiments.

BRIEF DESCRIPTION OF THE DRAWINGS

FIG. 7 is a graph showing an example of an output voltage transition as a function of the discharge time of a power supply control unit 601 according to the second embodiment; and FIG. 8 is a flowchart illustrating an example of a second battery authentication process performed by the electronic device 100 according to the second embodiment.

DESCRIPTION OF THE EMBODIMENTS

Exemplary embodiments, features, and aspects of the present invention will be described below with reference to the drawings. However, aspects of the present invention are not limited to the following embodiments.

First Embodiment

Figure 1A:
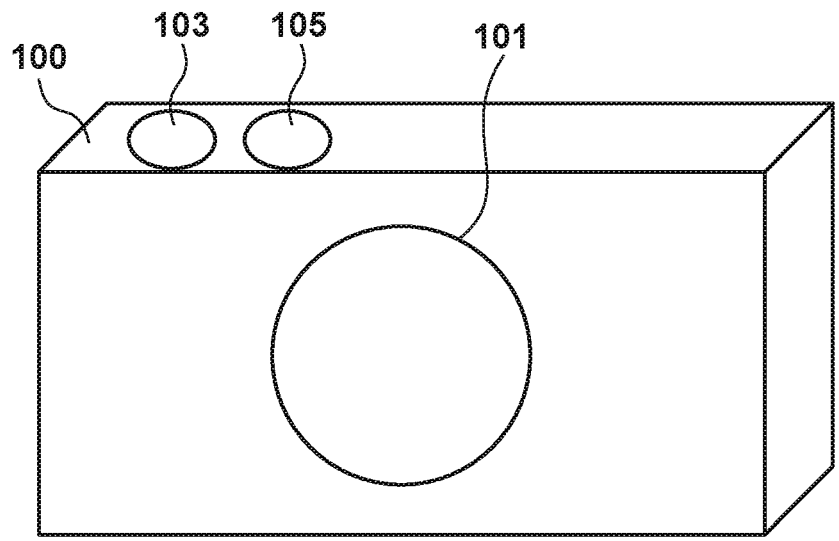
FIG. 1A is a perspective view illustrating an example of the outer appearance of an electronic device 100 according to a first embodiment.
Figure 1B:
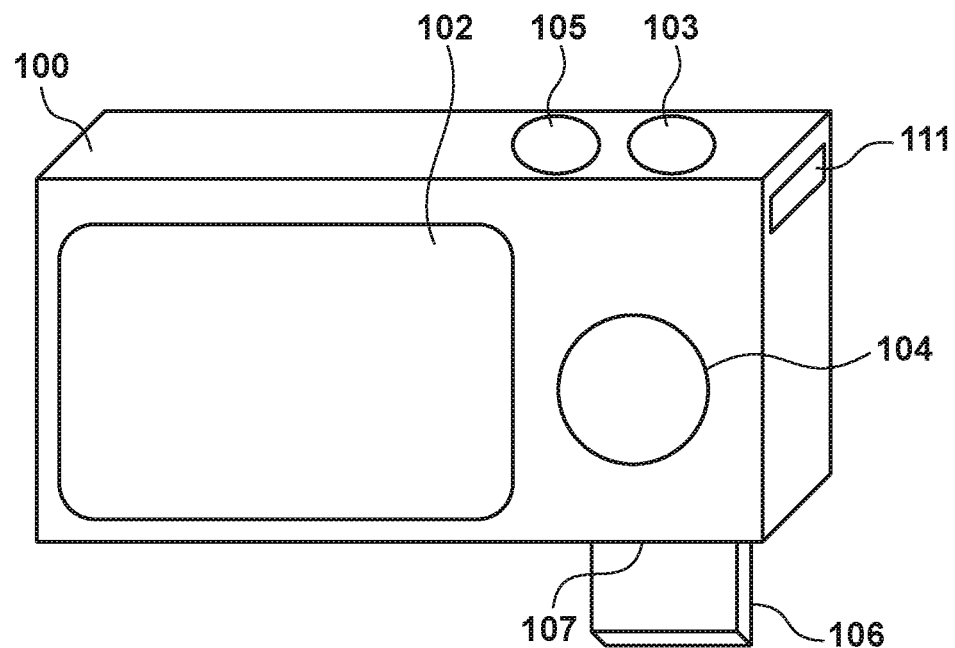
FIG. 1B is a perspective view illustrating another example of the outer appearance of an electronic device 100 according to the first embodiment.

FIGS. 1A and 1B are perspective views each illustrating an example of the outer appearance of an electronic device 100 according to the first embodiment. FIG. 1A is a perspective view illustrating the electronic device 100 when viewed from front. FIG. 1B is a perspective view illustrating the electronic device 100 when viewed rear. The first embodiment will exemplify a case in which an image capture apparatus in which the electronic device 100 acts as, for example, a digital camera. However, the electronic device 100 is not limited to a digital camera. The electronic device 100 may be, for example, a portable terminal, mobile phone, or notebook PC (personal computer).

An imaging optical system 101 includes an imaging lens and a shutter and forms an optical image on the light-receiving surface of an image sensor (a CCD sensor or the like). A display unit 102 includes, for example, a liquid crystal display, and displays an image or information. A system control unit 207 (see FIG. 2) controls an image or information to be displayed on the display unit 102. A shutter button 103 is a member for issuing an image capture instruction. An instruction input unit 104 includes various types of switches and buttons and a touch panel for receiving instructions from the user. A power switch 105 turns on and off the power of the electronic device 100 in accordance with a user operation. A power supply apparatus 106 outputs power supplied to each component of the electronic device 100, and includes a battery pack 301 and an AC adapter 305, as will be described later with reference to FIG. 3. The power supply apparatus 106 is detachable from the electronic device 100. When a connection unit 107 is connected to the power supply apparatus 106, the connection unit 107 supplies power supplied from the power supply apparatus 106 to each component of the electronic device 100. A second connection unit 111 is configured to be used in the second embodiment and can be omitted in the first embodiment. The details of the second connection unit 111 will be described in the second embodiment.

Figure 2:
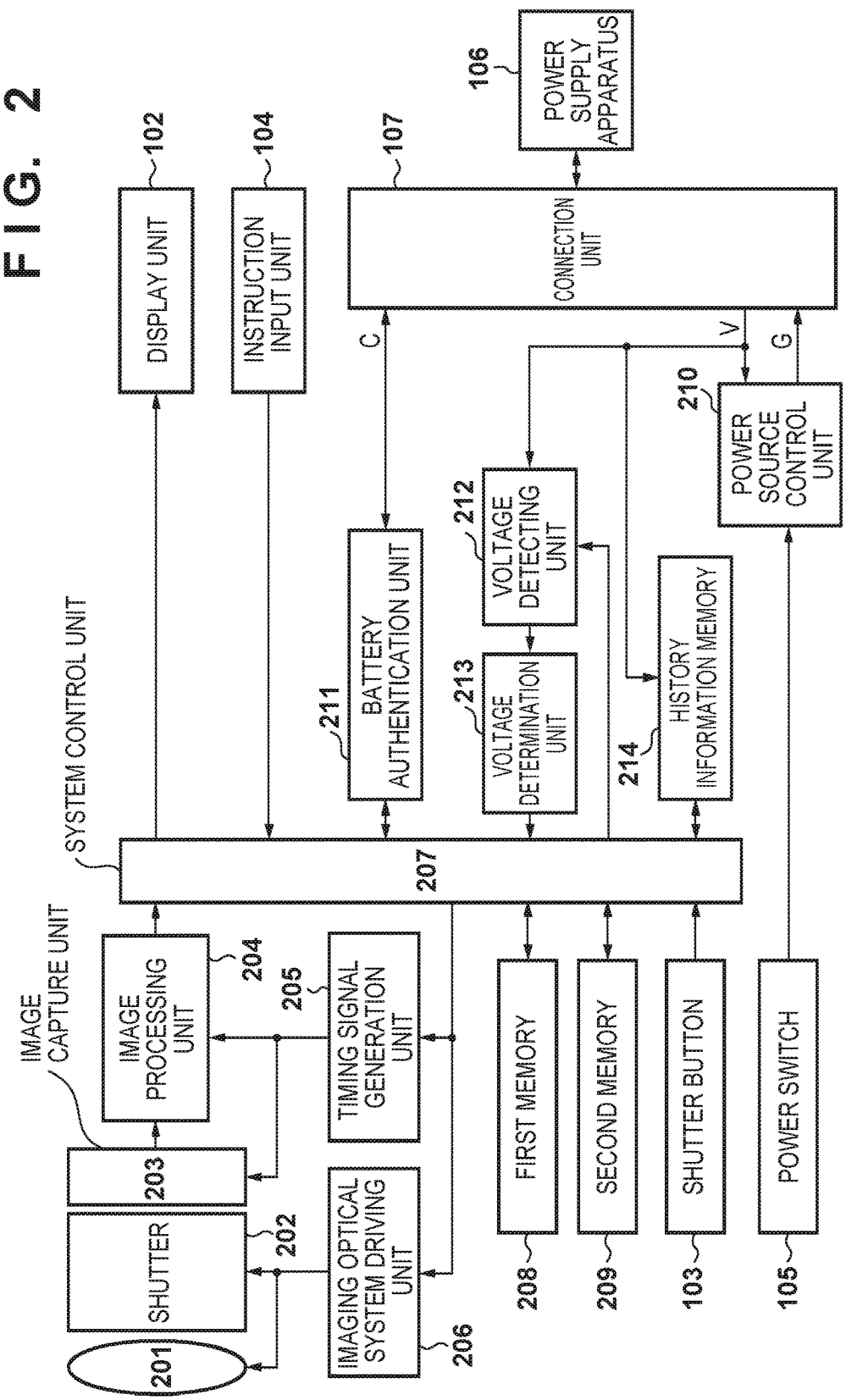
FIG. 2 is a block diagram illustrating an example of components of the electronic device 100 according to the first embodiment.

FIG. 2 is a block diagram illustrating an example of components of the electronic device 100 according to the first embodiment.

Referring to FIG. 2, an imaging lens 201 and a shutter 202 are included in the imaging optical system 101. An image capture unit 203 includes an image sensor (a CCD sensor or the like), a correlation double sampling unit, a programmable gain amplification unit, and an analog/digital converter, and generates image data from an optical image. An image processing unit 204 performs a predetermined image process to the image data generated by the image capture unit 203. A timing signal generation unit 205 generates signals for operating the image capture unit 203 and the image processing unit 204. An optical system driving unit 206 drives the imaging lens 201 and the shutter 202 under the control of the system control unit 207. The system control unit 207 controls each component of the electronic device 100. For example, the system control unit 207 includes one or more hardware processors configured to control the components of the electronic device 100.

Image data processed by the image processing unit 204 is written in a first memory 208 via the system control unit 207. The first memory 208 stores image data obtained by the image capture unit 203 and converted into digital data by the image processing unit 204 and image data to be displayed on the display unit 102. The first memory 208 has a storage capacity large enough to store a predetermined number of still images and a moving image and sound of a predetermined time. The first memory 208 also functions as an image display memory. The system control unit 207 superimposes predetermined data on image display data stored in the first memory 208 as needed, and supplies the resultant data to the display unit 102. The display unit 102 including a display device such as a liquid crystal display displays the display image data written in the first memory 208.

A second memory 209 is an electrically erasable programmable memory. For example, an EEPROM is used. The second memory 209 stores programs executed by the system control unit 207, control data such as parameters and tables used to execute programs, and correction data for damaged addresses and the like. The programs in this case include programs for causing the system control unit 207 to execute processes shown in flowcharts to be described later.

The first memory 208 also functions as a system memory to be used when the system control unit 207 controls each component of the electronic device 100. For example, programs, control data, correction data, and the like stored in the second memory 209 are loaded into the first memory 208. For example, when the system control unit 207 has started to operate, necessary programs, control data, correction data, and the like are stored from the second memory 209 into the first memory 208. Additional programs and data are transferred from the second memory 209 to the first memory 208, as needed.

The shutter button 103 and the instruction input unit 104 are members for inputting instructions from the user to the system control unit 207. In response to an image capture preparation instruction signal generated when the shutter button 103 is pressed half, the system control unit 207 starts an AF (autofocus) process, AE (autoexposure) process, AWB (auto white balance) process, and the like. In response to an image capture instruction signal generated when the shutter button 103 is pressed fully, the system control unit 207 instructs the image capture unit 203 to start image capturing. Image data generated by the image capture unit 203 is stored in a storage medium connected to the electronic device 100.

A power source control unit 210 supplies required power to each component of the system control unit 207 over a required period by using power from the power supply apparatus 106 via the connection unit 107 based on an instruction signal from the power switch 105. A battery authentication unit 211 executes an authentication process for authenticating the power supply apparatus 106. A voltage detecting unit 212 detects a voltage supplied from the power supply apparatus 106, and provides voltage information to a voltage determination unit 213. The voltage determination unit 213 compares the voltage information provided by the voltage detecting unit 212 with a predetermined reference voltage, and determines whether the power supply apparatus 106 is the battery pack 301 or the AC adapter 305. A history information memory 214 stores, as history information, an authentication result obtained by authentication executed by the battery authentication unit 211. The history information memory 214 can operate on power supplied from the power supply apparatus 106 regardless of the state (the power ON state or power OFF state) of the power source control unit 210. For example, in the first embodiment, power from the power supply apparatus 106 is supplied to the history information memory 214 without intermediacy of the power source control unit 210. Therefore, the history information memory 214 stores history information as long as power is supplied from the power supply apparatus 106 regardless of whether the power switch 105 is in the ON state or OFF state. In addition, for example, when the power supply apparatus 106 is detached from the electronic device 100 to interrupt power supplied to the history information memory 214, the history information stored in the history information memory 214 is deleted.

Figure 3:
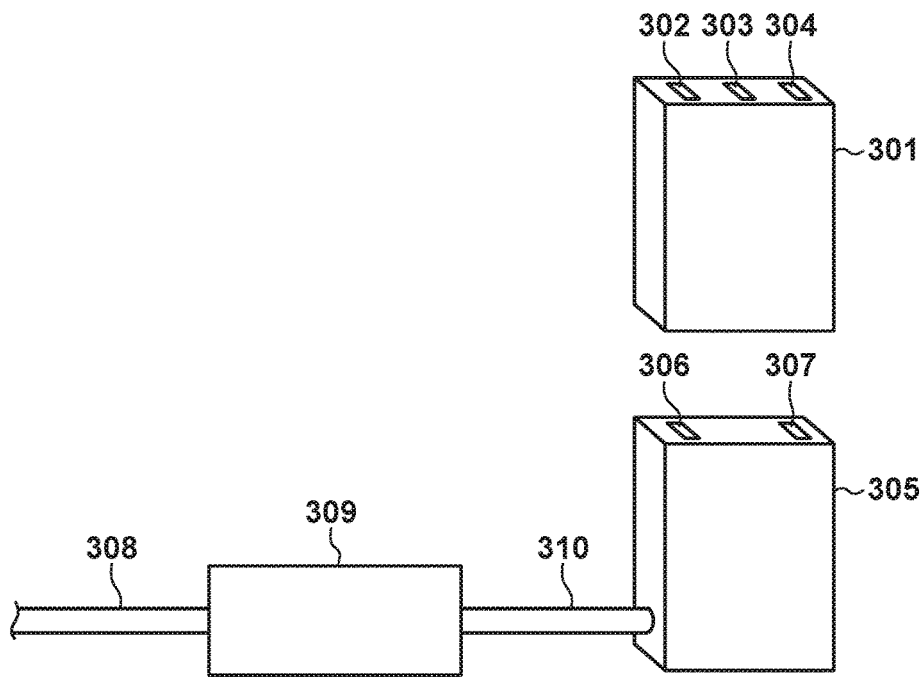
FIG. 3 is a view illustrating a battery pack 301 and an AC adapter 305 each as an example of a power supply apparatus 106.

FIG. 3 is a view illustrating the battery pack 301 and the AC adapter 305 each as example of the power supply apparatus 106.

The battery pack 301 and the AC adapter 305 each can be connected as the power supply apparatus 106 to the connection unit 107. The electronic device 100 can operate on power from the battery pack 301 connected to the connection unit 107. In addition, the electronic device 100 can receive power from the AC adapter 305 connected to the connection unit 107, and operate on the power. The AC adapter 305 is configured to supply power from an external power source (commercial power source) to the electronic device 100. The AC adapter 305 has almost the same shape as that of the battery pack 301.

The battery pack 301 has a positive terminal 302 and a negative terminal 304 which are used to supply power to the power source control unit 210 and the history information memory 214. The battery pack 301 also has a communication terminal 303 used for communication with the battery authentication unit 211. The positive terminal 302 is connected to the positive terminal of the connection unit 107. The negative terminal 304 is connected to the negative terminal of the connection unit 107. The communication terminal 303 is connected to the communication terminal of the connection unit 107.

The AC adapter 305 has a positive terminal 306 and a negative terminal 307 which are used to supply power to the power source control unit 210 and the history information memory 214. The AC adapter 305 is further connected to an AC-DC converter 309, which converts AC power into predetermined DC power, via a DC cable 310. The AC-DC converter 309 is connected to an external power source via an AC cable 308. The positive terminal 306 is connected to the positive terminal of the connection unit 107. The negative terminal 307 is connected to the negative terminal of the connection unit 107.

Figure 4:
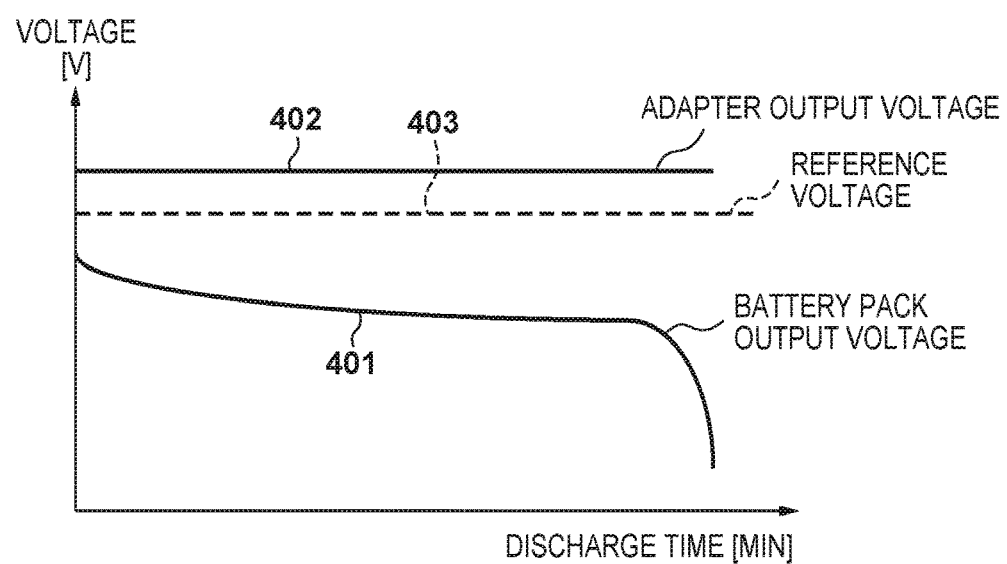
FIG. 4 is a graph showing an example of output voltage transitions as a function of the discharge time of the power supply apparatus 106 according to the first embodiment.

FIG. 4 is a graph showing an example of output voltage transitions as a function of the discharge time of the power supply apparatus 106 according to the first embodiment.

FIG. 4 shows an output voltage 401 from the positive terminal 302 corresponding to the negative terminal 304 of the battery pack 301 and an output voltage 402 from the positive terminal 306 corresponding to the negative terminal 307 of the AC adapter 305. In addition, FIG. 4 shows a reference voltage 403 to be referred to by the voltage determination unit 213.

The output voltage 402 of the AC adapter 305 which is the voltage of the positive terminal 306 corresponding to the negative terminal 307 is an almost constant voltage of, for example, 4.5 V. In constant, the output voltage 401 of the battery pack 301 which is the voltage of the positive terminal 302 corresponding to the negative terminal 304 of the battery pack 301 decreases with a reduction in storage capacitance caused by discharge. In this case, the output voltage 401 of the battery pack 301 changes depending on the discharge current value, temperature, and the like, but does not generally exceed 4.2 V. Therefore, the reference voltage 403 is set to a voltage lower than the output voltage of the AC adapter 305 and higher than the maximum output voltage of the battery pack 301, for example, 4.4 V. The voltage determination unit 213 can determine whether the power supply apparatus 106 connected to the connection unit 107 is the battery pack 301 or the AC adapter 305, by comparing a voltage supplied from the power supply apparatus 106 with this reference voltage.

Figure 5:
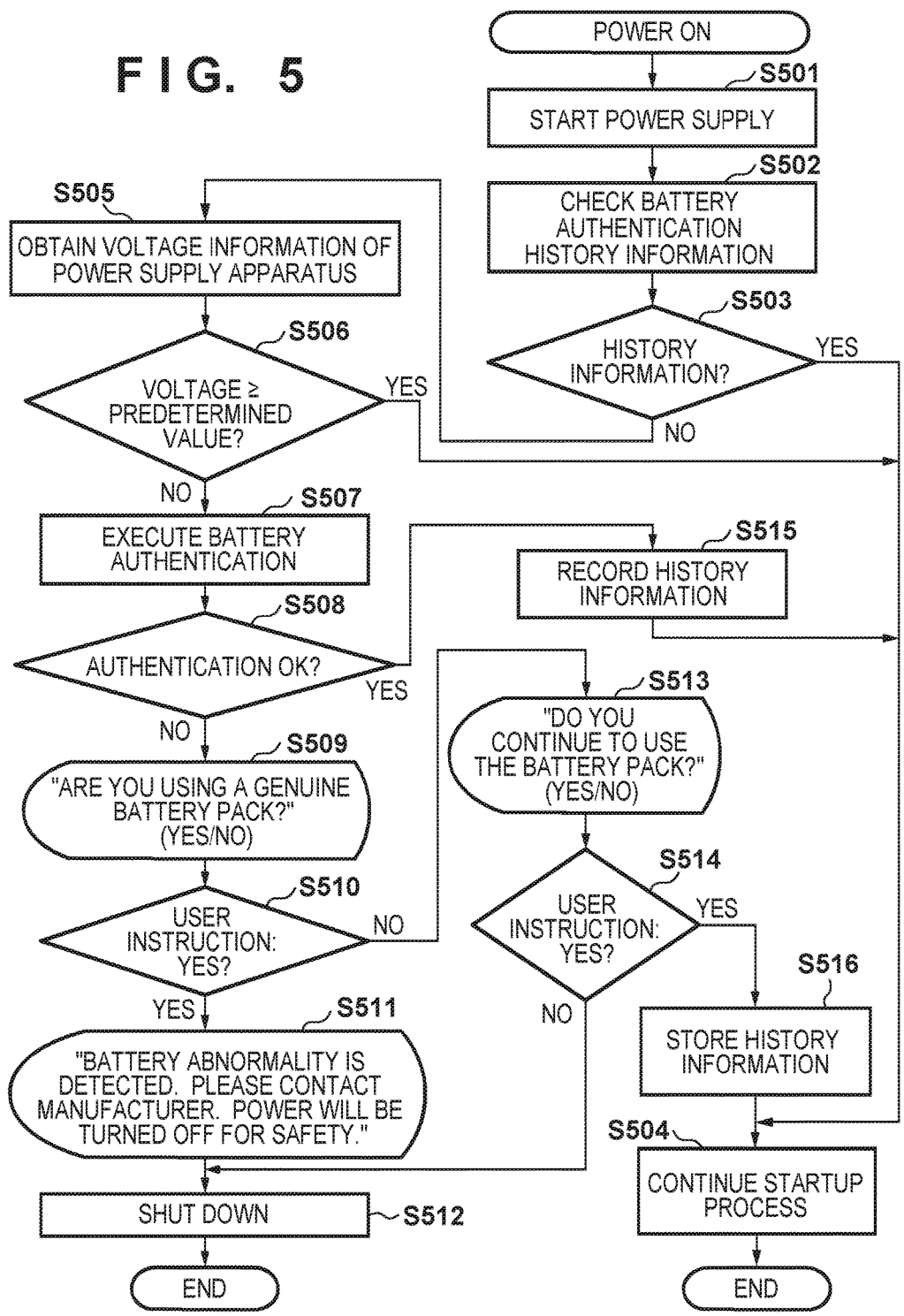
FIG. 5 is a flowchart illustrating an example of a first battery authentication process performed by the electronic device 100 according to the first embodiment.

FIG. 5 is a flowchart illustrating an example of a first battery authentication process performed by the electronic device 100 according to the first embodiment. The first battery authentication process is started when the power switch 105 is turned on while the power supply apparatus 106 is connected to the connection unit 107.

Referring to FIG. 5, in accordance with a power ON instruction issued by the user to the power switch 105, the power source control unit 210 starts supplying power to each component including the system control unit 207 by using power supplied from the power supply apparatus 106 via the connection unit 107 (step S501). The system control unit 207 refers to battery authentication history information stored in the history information memory 214 to check whether or not battery authentication has been done (step S502). In this case, the history information memory 214 operates on power supplied from the power supply apparatus 106 regardless of the state of the power source control unit 210. For this reason, the history information memory 214 stores battery authentication history information while the power supply apparatus 106 is connected to the connection unit 107 and supplies power, regardless of whether the power switch 105 is in the ON state or OFF state. In addition, when power supplied to the history information memory 214 is interrupted upon, for example, detachment of the power supply apparatus 106, the history information stored in the history information memory 214 is lost.

If battery authentication history information is stored in the history information memory 214 (YES in step S503), the system control unit 207 determines that battery authentication has been done with respect to the power supply apparatus 106, and then continues a predetermined startup process (step S504).

If no battery authentication history information is stored (NO in step S503), the system control unit 207 issues an instruction to the voltage detecting unit 212 to detect a voltage supplied from the power supply apparatus 106. Upon reception of this instruction, the voltage detecting unit 212 detects the voltage supplied from the power supply apparatus 106 (step S505), and notifies the voltage determination unit 213 of the detected voltage as voltage information. The voltage determination unit 213 compares the reference voltage 403 with the voltage indicated by the voltage information provided from the voltage detecting unit 212, and notifies the system control unit 207 of the comparison result. If the voltage indicated by the voltage information is equal to or higher than the reference voltage (YES in step S506), the system control unit 207 determines that the power supply apparatus 106 connected to the connection unit 107 is the AC adapter 305, and then continues a predetermined startup process (step S504).

If the voltage indicated by the voltage information is lower than the reference voltage (NO in step S506), the system control unit 207 determines that the power supply apparatus 106 connected to the connection unit 107 is the battery pack 301. In this case, the system control unit 207 issues an instruction to the battery authentication unit 211 to execute battery authentication of the power supply apparatus 106. Upon reception of the instruction, the battery authentication unit 211 executes battery authentication of the power supply apparatus 106 (step S507) and notifies the system control unit 207 of the authentication result. If the battery authentication has succeeded (YES in step S508), the system control unit 207 stores, in the history information memory 214, history information indicating that battery authentication has been completed (step S515), and then continues the predetermined startup process (step S504).

If the battery authentication has failed (NO in step S508), the system control unit 207 makes the user select whether he/she can use the power supply apparatus 106 or not. In the first embodiment, however, upon determining that the user can recognize that the power supply apparatus 106 connected to the connection unit 107 is not a genuine battery pack when battery authentication has failed, the system control unit 207 makes the user select whether he/she can use the power supply apparatus 106 or not. Upon determining that the user cannot recognize that the power supply apparatus 106 connected to the connection unit 107 is not a genuine battery pack in spite of the failure of the battery authentication, the system control unit 207 shifts the electronic device 100 to the power OFF state. A process to be performed when the battery authentication executed in step S507 has failed (NO in step S508) will be described in detail below.

If authentication has failed, the system control unit 207 displays a message, for example, "Are you using a genuine battery pack?" on the display unit 102 to prompt the user to input "YES" or "NO" from the instruction input unit 104 (step S509). If the user responds by inputting "YES" via the instruction input unit 104 (YES in step S510), the user recognizes that the power supply apparatus 106 connected to the connection unit 107 is a genuine battery pack. This case corresponds to either case (1) or case (2) described below:

(1) Although the power supply apparatus 106 connected to the connection unit 107 is a genuine battery pack, the system control unit 207 could not normally authenticate the battery back because of some factor such as a malfunction.

(2) The power supply apparatus 106 connected to the connection unit 107 is an unauthentic battery pack disguised as a genuine battery pack, and the user has misidentified the battery pack as a genuine battery pack.

In either case (1) or case (2), continuing the operation of the electronic device 100 by using the power supply apparatus 106 connected to the connection unit 107 may reduce safety. For this reason, in order to notify the user of the corresponding information, the system control unit 207 displays a message, for example, "Battery abnormality is detected. Please contact the manufacturer. Power will be turned off for safety." on the display unit 102 (step S511). The system control unit 207 then shuts down the electronic device 100 (step S512).

Assume that the user has recognized that the power supply apparatus 106 connected to the connection unit 107 is not genuine battery pack, and has input "NO" via the instruction input unit 104 (NO in step S510). This case corresponds to either case (3) or case (4) described below:

(3) Although the user recognizes that the power supply apparatus 106 connected to the connection unit 107 is not a genuine battery pack, he/she feels anxious about its quality or safety.

(4) The battery pack in question is a battery pack manufactured by a third party.

The discharge characteristics of a battery pack manufactured by a third party are unknown. In order to notify the user of the corresponding information, therefore, the system control unit 207 displays a message, for example, "Do you continue to use the battery pack?" on the display unit 102 to prompt the user to input "YES" or "NO" from the instruction input unit 104 (step S513). In this case, if the user has input "YES" via the instruction input unit 104 (YES in step S514), the system control unit 207 determines that the user has selected to use the battery pack, and stores history information indicating that the battery pack authentication has been completed in the history information memory 214 (step S516). The system control unit 207 then continues the predetermined startup process (step S504). In this manner, the user permits the use of the power supply apparatus 106 connected to the connection unit 107. If the user has input "NO" via the instruction input unit 104 (NO in step S514), the system control unit 207 shuts down the electronic device 100 (step S512).

Referring to FIG. 5, if battery authentication has succeeded in step S507 (YES in step S508), or the user inputs "YES" via the instruction input unit 104 in step S513 (YES in step S514), battery authentication history information is stored in the history information memory 214. If the user inputs "YES" via the instruction input unit 104 in step S509 (YES in step S510), or the user inputs "NO" via the instruction input unit 104 in step S513 (NO in step S514), battery authentication history information is not stored in the history information memory 214. As described above, the history information memory 214 operates on a voltage supplied from the power supply apparatus 106 regardless of the state of the power source control unit 210. For this reason, if the power supply apparatus 106 is detached from the connection unit 107, that is, if the power supply apparatus 106 is replaced, the history information in the history information memory 214 is cleared. The system control unit 207 determines whether or not the power supply apparatus 106 has been authenticated, depending on whether battery authentication history information is stored in the history information memory 214. With this control, it is possible to inhibit the execution of battery authentication every time the power switch 105 is turned on or the display of a message corresponding to an authentication result, unless the authenticated battery pack 301 is detached. In addition, if the power supply apparatus 106 connected to the connection unit 107 is the AC adapter 305, information indicating that battery authentication has failed (S510) is not displayed or the user is not required to input any instruction thereafter (steps S511 to S514). This inhibits the operation of inquiring of the user about authentication every time the power switch 105 is turned on in spite of the fact that the use of the battery pack has been approved once, thereby improving convenience for the user.

Note that although the output voltage of the AC adapter 305 as the positive terminal 306 corresponding to the negative terminal 307 is constant, voltage information obtained by the voltage detecting unit 212 sometimes becomes lower than the reference voltage because of a voltage drop caused by contact friction with the connection unit 107 and an operating current. It is therefore preferable not to start the operation of the image capture unit 203 or the optical system driving unit 206 until the voltage detecting unit 212 obtains voltage information indicating a voltage supplied from the power supply apparatus 106.

In this manner, the electronic device 100 can properly determine the identity of the power supply apparatus 106 and perform control in accordance with the identity of the power supply apparatus 106. This can improve convenience for the user while ensuring the safety of the electronic device 100.

Second Embodiment

The second embodiment will be described next. The second embodiment will also exemplify a digital camera as an electronic device 100. The electronic device 100 has the same outer appearance as that shown in FIGS. 1A and 1B. Referring to FIG. 1B, a second connection unit 111 is an interface for connection to an external apparatus. The second connection unit 111 allows connection of, for example, a USB (Universal Serial Bus) cable and can receive power supplied from the external apparatus.

Figure 6:
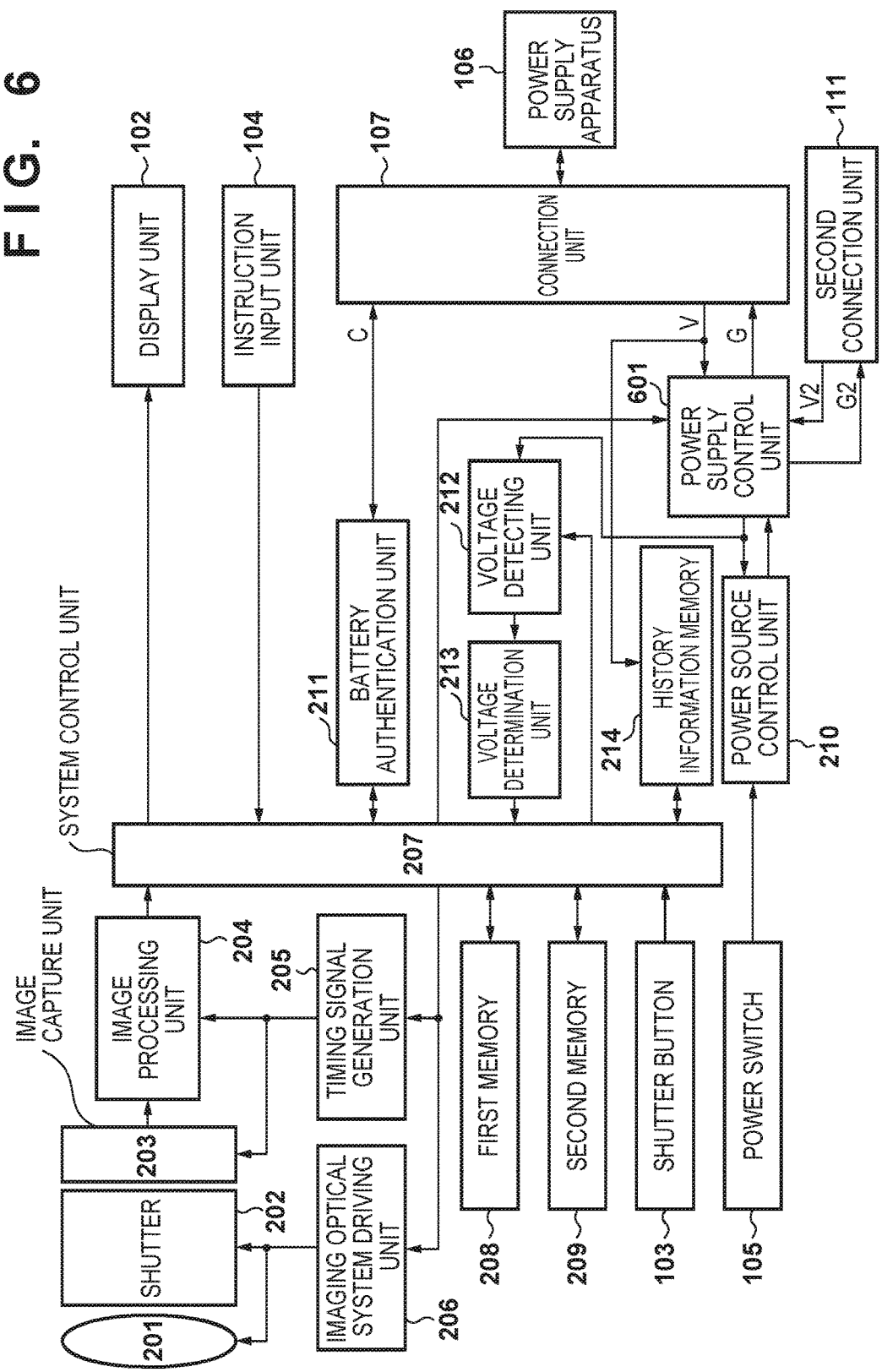
FIG. 6 is a block diagram illustrating an example of components of an electronic device 100 according to a second embodiment.

FIG. 6 is a block diagram illustrating an example of components of the electronic device 100 according to the second embodiment. The same reference numerals in FIG. 6 as those in the first embodiment denote the same components as those of the electronic device 100 (see FIG. 2) according to the first embodiment. Referring to FIG. 6, a power supply control unit 601 can supply power supplied from a power supply apparatus 106 connected to a connection unit 107 and power supplied from an external apparatus connected to the second connection unit 111 to a power source control unit 210.

In the second embodiment, the power supply control unit 601 supplies power supplied from the external apparatus to the power source control unit 210 in preference to power supplied from the power supply apparatus 106. If power supplied from the external apparatus is insufficient, the power supply control unit 601 supplies both power supplied from the external apparatus and power supplied from the power supply apparatus 106 to the power source control unit 210. In addition, if the external apparatus is not connected to the second connection unit 111, the power supply control unit 601 supplies power supplied from the power supply apparatus 106 to the power source control unit 210. Furthermore, if the external apparatus is not connected to the second connection unit 111, the power supply control unit 601 can stop power supply from the external apparatus and supply power supplied from the power supply apparatus 106 to the power source control unit 210 in accordance with an instruction from a system control unit 207. In this case, the power supply control unit 601 is provided with a regulator for an input from the external apparatus. If, for example, a voltage of 5.0 V is input from the external apparatus, the power supply control unit 601 supplies a voltage of 4.5 V to the power source control unit 210. In addition, upon reception of an input from the power supply apparatus 106, the power supply control unit 601 outputs the voltage without any change. Note that the system control unit 207 has the same arrangement as that of the system control unit 207 shown in FIG. 2 except that it can issue an instruction to the power supply control unit 601.

FIG. 7 is a graph showing an example of an output voltage transition as a function of the discharge time of the power supply control unit 601 according to the second embodiment. FIG. 7 shows a case in which a battery pack 301 as the power supply apparatus 106 is connected to the connection unit 107.

Referring to FIG. 7, in the interval from time $T_0$ to time $T_1$, the battery pack 301 is connected to the connection unit 107, and the external apparatus is not connected to the second connection unit 111. In this case, the power supply control unit 601 supplies power supplied from the battery pack 301 to the power source control unit 210, and hence has the same output voltage as the voltage of the battery pack 301. In the interval from time $T_1$ to time $T_2$, the battery pack 301 is connected to the connection unit 107, and the external apparatus is connected to the second connection unit 111. That is, the power supply control unit 601 receives power from both of them. Since the power supply control unit 601 supplies power supplied from the external apparatus to the power source control unit 210 in preference to power supplied from the power supply apparatus 106, the output voltage is equal to the output voltage of the regulator provided for the power supply control unit 601.

In the interval from discharge time $T_2$ to time $T_3$, the battery pack 301 is connected to the connection unit 107, and the external apparatus is connected to the second connection unit 111. However, the system control unit 207 has issued an instruction to the power supply control unit 601 so as not to supply power supplied from the external apparatus to the power source control unit 210. Therefore, the power supply control unit 601 supplies power supplied from the battery pack 301 to the power source control unit 210, and hence has the same output voltage as that of the battery pack 301.

In the interval from discharge time $T_3$ to time $T_4$, the battery pack 301 is connected to the connection unit 107, and the external apparatus is connected to the second connection unit 111. Therefore, the power supply control unit 601 supplies power supplied from the external apparatus to the power source control unit 210, and hence has the same output voltage as the output voltage of the regulator provided for the power supply control unit 601.

In the interval from discharge time $T_4$ to time $T_5$, the battery pack 301 is connected to the connection unit 107, and the external apparatus is connected to the second connection unit 111. In this interval, the power supply control unit 601 supplies power supplied from the external apparatus to the power source control unit 210 in preference to power supplied from the power supply apparatus 106. Assume that the external apparatus connected to the second connection unit 111 via a USB cable or the like has its upper limit of power supply ability, and the power source control unit 210 requires power equal to or higher than the upper limit value. In this case, the power supply control unit 601 supplies both power supplied from the external apparatus and power supplied from the battery pack 301 to the power source control unit 210, and hence has the same output voltage as the voltage of the battery pack 301.

FIG. 8 is a flowchart illustrating an example of a second battery authentication process performed by the electronic device 100 according to the second embodiment. The second battery authentication process is started when a power switch 105 is turned on while the power supply apparatus 106 is connected to the connection unit 107, and the external apparatus is connected to the second connection unit 111. The same reference numerals in FIG. 8 as those in the first embodiment denote the same processes as those (see FIG. 5) included in the first battery authentication process in the first embodiment.

Referring to FIG. 8, if no battery authentication history information is stored in a history information memory 214 (NO in step S503), the system control unit 207 issues an instruction to the power supply control unit 601 not to supply power supplied from the external apparatus to the power source control unit 210. Upon reception of the instruction, the power supply control unit 601 stops supplying power supplied from the external apparatus via the second connection unit 111 into the electronic device 100 (step S801). In this state, the system control unit 207 issues an instruction to a voltage detecting unit 212 to detect a voltage supplied from the power supply control unit 601. Upon reception of the instruction, the voltage detecting unit 212 detects the voltage supplied from the power supply control unit 601 (step S802), and notifies the voltage determination unit 213 of the detected voltage as voltage information.

In general, when the power supply control unit 601 supplies power supplied from the external apparatus to the power source control unit 210 in preference to power supplied from the power supply apparatus 106, the output voltage becomes equal to the output voltage of the regulator provided for the power supply control unit 601. For this reason, it is not possible to obtain voltage information indicating the voltage supplied from the power supply apparatus 106 from an output from the power supply control unit 601. For this reason, as in steps S801 and S802, the power supply control unit 601 is inhibited from supplying power supplied from the external apparatus to the power source control unit 210. This allows the voltage detecting unit 212 to detect the voltage supplied from the power supply apparatus 106 even if the external apparatus is connected to the second connection unit 111.

Upon detection of the voltage supplied from the power supply apparatus 106, the system control unit 207 issues an instruction to the power supply control unit 601 to supply power supplied from the external apparatus to the power source control unit 210. Upon reception of this instruction, the power supply control unit 601 starts to supply power supplied from the external apparatus and supplies the power supplied from the external apparatus to the power source control unit 210 in preference to power supplied from the power supply apparatus 106 (step S803).

Note that if power supplied from the external apparatus is not required, the process may skip step S803. In addition, although the above description has described the electronic device 100 according to the second embodiment which is configured to connect a cable to the second connection unit 111 and receive power supplied from the external apparatus, the device may be configured to receive power wirelessly by using magnetic field resonance or the like.

As described above, even when receiving power supplied from the external apparatus via the second connection unit 111, the electronic device 100 can properly determine the identity of the power supply apparatus 106. Storing the identity of the power supply apparatus 106 in the history information memory 214 can improve the convenience for the user while maintaining the safety of the electronic device as in the first embodiment.

Note that in the first and second embodiments, a voltage supplied from the power supply apparatus 106 is compared with the reference voltage to determine whether the power supply apparatus 106 connected to the connection unit 107 is the battery pack 301 or the AC adapter 305. However, this is not exhaustive. For example, it is possible to use a method of determining whether the power supply apparatus 106 connected to the connection unit 107 is the battery pack 301 or the AC adapter 305, by detecting a specific structure added to the battery pack 301.

In addition, according to the arrangements of the first and second embodiments, the electronic device 100 can be connected to both the battery pack 301 and the AC adapter 305, the electronic device 100 may be an electronic device which can be connected to the battery pack 301 but cannot be connected to the AC adapter 305. In this case as well, once a battery pack is permitted to be used, the electronic device 100 does not inquire about whether to continue to use the battery pack every time the power switch 105 is turned on. This improves convenience. In addition, in this case, it is possible to omit the process in steps S505 and S506 in the first embodiment and to omit the processes in steps S801 to S803 and step S506 in the second embodiment.

Furthermore, in the first and second embodiments, when history information is stored in the history information memory 214, battery authentication is inhibited. However, even when history information is stored in the history information memory 214, battery authentication may be executed. This is because, no problem arises in terms of convenience for the user, even if battery authentication is executed, as long as an inquiry to the user (steps S509 to S511 and S513 to S514) is inhibited when history information is stored in the history information memory 214.

Third Embodiment

Various functions, processes, and methods described in the first and second embodiment can be implemented by a personal computer, microcomputer, CPU (central processing unit), or the like using programs. In the third embodiment, a personal computer, microcomputer, CPU (central processing unit), or the like will be referred to as "computer X". In addition, in the third embodiment, programs which are used to control the computer X and implement various functions, processes, and methods described with reference to the first and second embodiments will be referred to as "programs Y".

The computer X implements various functions, processes, and methods described in the first and second embodiments by executing the programs Y. In this case, the programs Y are supplied to the computer X via a computer-readable storage medium. The computer-readable storage medium according to the third embodiment includes at least one of a hard disk drive, magnetic storage device, optical storage device, magnetooptical storage device, memory card, volatile memory, nonvolatile memory, and the like. The computer-readable storage medium according to the third embodiment is a non-transitory storage medium.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

This application claims priority from Japanese Patent Application No. 2015-201584, filed Oct. 9, 2015, which is hereby incorporated by reference herein in its entirety.

What is claimed is:
1. An electronic device comprising:
a storage unit; and
a control circuitry that (a) causes the storage unit to store predetermined information if a power supply apparatus connected to the electronic device is a genuine battery pack, (b) prompts a user to select whether the power supply apparatus is a genuine battery pack if the predetermined information is not present in the storage unit and if the power supply apparatus is not a genuine battery pack, (c) prompts the user to select whether the user wants to use the power supply apparatus if the user has selected that the power supply apparatus is not a genuine battery pack, (d) causes the storage unit to store the predetermined information if the user has selected that the user wants to use the power supply apparatus, and (e) enables a shutdown process if the power supply apparatus is not a genuine battery pack and if the user has selected that the power supply apparatus is a genuine battery pack, wherein if the predetermined information is present in the storage unit, the control circuitry permits the user to use the power supply apparatus without prompting the user to select whether the power supply apparatus is a genuine battery pack.

2. The electronic device according to claim 1, wherein if the predetermined information is present in the storage unit, the control circuitry permits the user to use the power supply apparatus without performing an authentication process with the power supply apparatus.

3. The electronic device according to claim 1, wherein the control circuitry determines whether the power supply apparatus is a battery pack or an AC adapter, and wherein if the power supply apparatus is an AC adapter, the control circuitry permits the user to use the power supply apparatus without performing an authentication process with the power supply apparatus.

4. The electronic device according to claim 1, wherein the control circuitry determines, based on a voltage supplied from the power supply apparatus, whether the power supply apparatus is a battery pack or an AC adapter.

5. The electronic device according to claim 1, wherein the control circuitry determines that the power supply apparatus is an AC adapter if a voltage supplied from the power supply apparatus is not less than a reference voltage, and determines that the power supply apparatus is a battery pack if a voltage supplied from the power supply apparatus is less than the reference voltage.

6. The electronic device according to claim 1, wherein the electronic device is an image capture device.

7. The electronic device according to claim 1, wherein the electronic device is a device capable of acting as a digital camera.

8. The electronic device according to claim 1, wherein the electronic device is a mobile device.

9. The electronic device according to claim 1, wherein the electronic device is a mobile phone.

10. The electronic device according to claim 1, wherein the predetermined information is removed from the storage unit if the power supply apparatus is removed from the electronic device.

11. A method executed by a control circuitry of an electronic device, the method comprising:
   causing a storage unit to store predetermined information if a power supply apparatus connected to the electronic device is a genuine battery pack;
   prompting a user to select whether the power supply apparatus is a genuine battery pack if the predetermined information is not present in the storage unit and if the power supply apparatus is not a genuine battery pack;
   prompting the user to select whether the user wants to use the power supply apparatus if the user has selected that the power supply apparatus is not a genuine battery pack;
   causing the storage unit to store the predetermined information if the user has selected that the user wants to use the power supply apparatus;
   enabling a shutdown process if the power supply apparatus is not a genuine battery pack and if the user has selected that the power supply apparatus is a genuine battery pack; and
   permitting the user to use the power supply apparatus without prompting the user to select whether the power supply apparatus is a genuine battery pack if the predetermined information is present in the storage unit.

12. The method according to claim 11, further comprising permitting the user to use the power supply apparatus without performing an authentication process with the power supply apparatus if the predetermined information is present in the storage unit.

13. The method according to claim 11, further comprising:
   determining whether the power supply apparatus is a battery pack or an AC adapter; and
   permitting the user to use the power supply apparatus without performing an authentication process with the power supply apparatus if the power supply apparatus is an AC adapter.

14. The method according to claim 11, further comprising determining, based on a voltage supplied from the power supply apparatus, whether the power supply apparatus is a battery pack or an AC adapter.

15. The method according to claim 11, further comprising:
   determining that the power supply apparatus is an AC adapter if a voltage supplied from the power supply apparatus is not less than a reference voltage; and
   determining that the power supply apparatus is a battery pack if a voltage supplied from the power supply apparatus is less than the reference voltage.

16. The method according to claim 11, wherein the electronic device is an image capture device.

17. The method according to claim 11, wherein the electronic device is a device capable of acting as a digital camera.

18. The method according to claim 11, wherein the electronic device is a mobile device.

19. The method according to claim 11, wherein the electronic device is a mobile phone.

20. The method according to claim 11, wherein the predetermined information is removed from the storage unit if the power supply apparatus is removed from the electronic device.

21. A non-transitory storage medium that stores a program causing a control circuitry of an electronic device to execute:
   causing a storage unit to store predetermined information if a power supply apparatus connected to the electronic device is a genuine battery pack;
   prompting a user to select whether the power supply apparatus is a genuine battery pack if the predetermined information is not present in the storage unit and if the power supply apparatus is not a genuine battery pack;
   prompting the user to select whether the user wants to use the power supply apparatus if the user has selected that the power supply apparatus is not a genuine battery;
   causing the storage unit to store the predetermined information if the user has selected that the user wants to use the power supply apparatus;
   enabling a shutdown process if the power supply apparatus is not a genuine battery pack and if the user has selected that the power supply apparatus is a genuine battery pack; and permitting the user to use the power supply apparatus without prompting the user to select whether the power supply apparatus is a genuine battery pack if the predetermined information is present in the storage unit.

22. An electronic device comprising:
a storage unit; and
a control circuitry that (a) causes the storage unit to store predetermined information if a power supply apparatus connected to the electronic device is a predetermined battery pack, (b) prompts a user to select whether the power supply apparatus is a predetermined battery pack if the predetermined information is not present in the storage unit and if the power supply apparatus is not a predetermined battery pack, (c) prompts the user to select whether the user wants to use the power supply apparatus if the user has selected that the power supply apparatus is not a predetermined battery pack, (d) causes the storage unit to store the predetermined information if the user has selected that the user wants to use the power supply apparatus, and (e) enables a shutdown process if the power supply apparatus is not a predetermined battery pack and if the user has selected that the power supply apparatus is a predetermined battery pack,
wherein if the predetermined information is present in the storage unit, the control circuitry permits the user to use the power supply apparatus without prompting the user to select whether the power supply apparatus is a predetermined battery pack.

23. The electronic device according to claim 22, wherein if the predetermined information is present in the storage unit, the control circuitry permits the user to use the power supply apparatus without performing an authentication process with the power supply apparatus.

24. The electronic device according to claim 22, wherein the control circuitry determines whether the power supply apparatus is a battery pack or an AC adapter, and
wherein if the power supply apparatus is an AC adapter, the control circuitry permits the user to use the power supply apparatus without performing an authentication process with the power supply apparatus.

25. The electronic device according to claim 22, wherein the control circuitry determines, based on a voltage supplied from the power supply apparatus, whether the power supply apparatus is a battery pack or an AC adapter.

26. The electronic device according to claim 22, wherein the control circuitry determines that the power supply apparatus is an AC adapter if a voltage supplied from the power supply apparatus is not less than a reference voltage, and determines that the power supply apparatus is a battery pack if a voltage supplied from the power supply apparatus is less than the reference voltage.

27. The electronic device according to claim 22, wherein the electronic device is an image capture device.

28. The electronic device according to claim 22, wherein the electronic device is a device capable of acting as a digital camera.

29. The electronic device according to claim 22, wherein the electronic device is a mobile device.

30. The electronic device according to claim 22, wherein the electronic device is a mobile phone.

31. The electronic device according to claim 22, wherein the predetermined information is removed from the storage unit if the power supply apparatus is removed from the electronic device.

32. A method executed by a control circuitry of an electronic device, the method comprising:
causing a storage unit to store predetermined information if a power supply apparatus connected to the electronic device is a predetermined battery pack;
prompting a user to select whether the power supply apparatus is a predetermined battery pack if the predetermined information is not present in the storage unit and if the power supply apparatus is not a predetermined battery pack;
prompting the user to select whether the user wants to use the power supply apparatus if the user has selected that the power supply apparatus is not a predetermined battery pack;
causing the storage unit to store the predetermined information if the user has selected that the user wants to use the power supply apparatus;
enabling a shutdown process if the power supply apparatus is not a predetermined battery pack and if the user has selected that the power supply apparatus is a predetermined battery pack; and
permitting the user to use the power supply apparatus without prompting the user to select whether the power supply apparatus is a predetermined battery pack if the predetermined information is present in the storage unit.

33. The method according to claim 32, further comprising permitting the user to use the power supply apparatus without performing an authentication process with the power supply apparatus if the predetermined information is present in the storage unit.

34. The method according to claim 32, further comprising:
determining whether the power supply apparatus is a battery pack or an AC adapter; and
permitting the user to use the power supply apparatus without performing an authentication process with the power supply apparatus if the power supply apparatus is an AC adapter.

35. The method according to claim 32, further comprising determining, based on a voltage supplied from the power supply apparatus, whether the power supply apparatus is a battery pack or an AC adapter.

36. The method according to claim 32, further comprising:
determining that the power supply apparatus is an AC adapter if a voltage supplied from the power supply apparatus is not less than a reference voltage; and
determining that the power supply apparatus is a battery pack if a voltage supplied from the power supply apparatus is less than the reference voltage.

37. The method according to claim 32, wherein the electronic device is an image capture device.

38. The method according to claim 32, wherein the electronic device is a device capable of acting as a digital camera.

39. The method according to claim 32, wherein the electronic device is a mobile device.

40. The method according to claim 32, wherein the electronic device is a mobile phone.

41. The method according to claim 32, wherein predetermined information is removed from the storage unit if the power supply apparatus is removed from the electronic device.

42. A non-transitory storage medium that stores a program causing a control circuitry of an electronic device to execute:

causing a storage unit to store predetermined information if a power supply apparatus connected to the electronic device is a predetermined battery pack;

prompting a user to select whether the power supply apparatus is a predetermined battery pack if the predetermined information is not present in the storage unit and if the power supply apparatus is not a predetermined battery pack;

prompting the user to select whether the user wants to use the power supply apparatus if the user has selected that the power supply apparatus is not a predetermined battery pack;

causing the storage unit to store the predetermined information if the user has selected that the user wants to use the power supply apparatus;

enabling a shutdown process if the power supply apparatus is not a predetermined battery pack and if the user has selected that the power supply apparatus is a predetermined battery pack; and permitting the user to use the power supply apparatus without prompting the user to select whether the power supply apparatus is a predetermined battery pack if the predetermined information is present in the storage unit.

\* \* \* \* \*